Aug. 9, 1938.   R. GAHL   2,125,909
METALLURGICAL REDUCTION PROCESS
Filed June 10, 1935
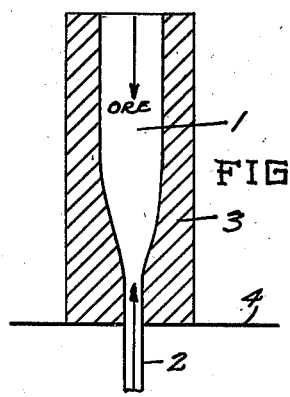
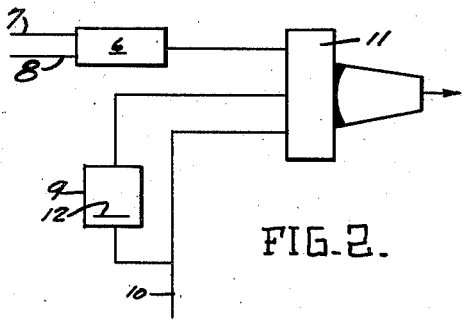
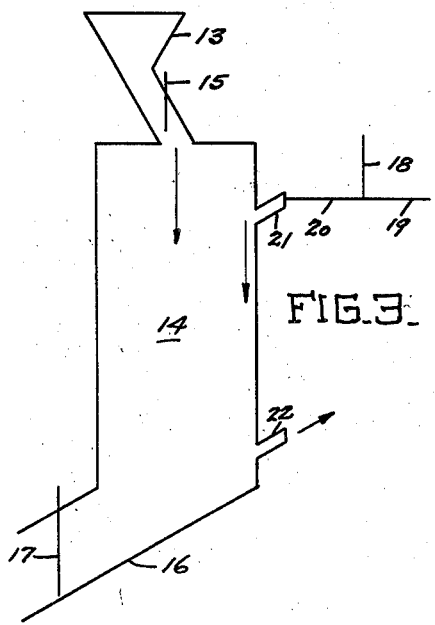
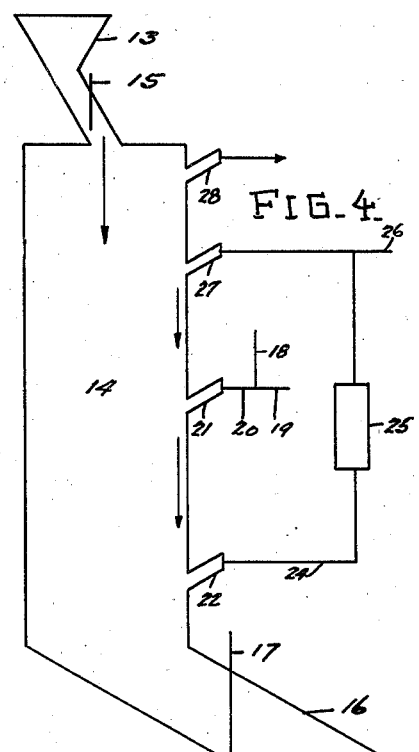
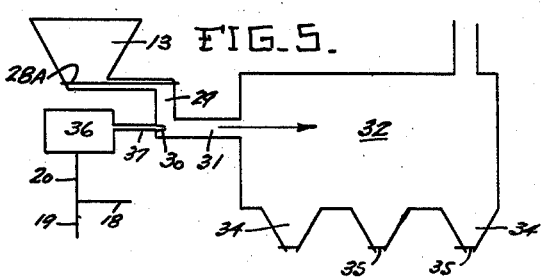
INVENTOR
RUDOLF GAHL
BY
ATTORNEY Patented Aug. 9, 1938

2,125,909

UNITED STATES PATENT OFFICE 2,125,909

METALLURGICAL REDUCTION PROCESS

Rudolf Gahl, Berkeley, Calif.

Application June 10, 1935, Serial No. 25,772

2 Claims. (Cl. 75—34)

This case presents matter which, in its essentials, was originally contained in my application Ser. No. 652,195, filed January 17, 1933, but is now being made the subject of this separate application.

The processes to be described are particularly applicable to the production of metals, for instance iron, nickel, cobalt, copper, zinc, manganese, etc., but they may also serve for processes in which the reduction is not carried to the metallic state. The reduction of iron oxide ore, say hematite or limonite, to magnetite is an example of a reduction of this type. My processes are particularly suited to be operated below the fusion temperature of the metals or metal compounds produced by the reduction. On account of the comparatively low temperatures at which they may be carried out they may be used for the production of unsintered, finely divided, chemically active metals and metal compounds. My processes differ from other metallurgical reduction processes essentially in the following respects:

1. The reducing agent is applied to the ore in gaseous form. It should be clearly understood however that the term "gaseous reducing agent" does not exclude the use of liquid or even solid substances, provided that they are changed into a gaseous condition before being utilized for the reduction processes in question.

2. The gaseous reducing agent is produced by an exothermic oxidation reaction and the exothermicity of the oxidation reaction is utilized to make the process consisting of this oxidation-reaction coupled with the actual reduction of the ore thermally self sustaining.

That processes depending on gaseous reducing agents have not come into more general use seems due to certain inherent limitations. The principal one is that the chemical reactions utilized were not sufficiently exothermic to maintain themselves thermally without the introduction of heat not generated by the process. Thus some of them are conducted in muffles or kilns depending on introduction of heat through the walls, while others make up for the gradual cooling of the reaction chamber by alternating the reduction operation with a heat producing combustion in the same chamber. The present process produces sufficient heat to maintain the reaction and therefore does away with such complications.

It is true that some of the simple reducing gases like hydrogen and carbon monoxide will, with the reacting substances sufficiently preheated, thermally maintain the reduction process. This is at least true for certain temperature ranges. Thus hydrogen when reacting with iron ore at a sufficiently high temperature and carbon monoxide when used at a sufficiently low temperature will do this, undoubtedly due to the exothermic character of the reduction. But the temperature at which, for instance, the reduction of iron by hydrogen turns exothermic is higher than the temperature at which the reduction should be carried out if serious sintering and melting are to be avoided. For this reason hydrogen by itself is hardly suited for reduction processes of the type considered herein. Carbon monoxide on the other hand is fairly exothermic, when reacting with iron oxides at temperatures that are suited for the reduction and there is no valid reason why carbon monoxide should not be successfully employed for the purpose except the fact that other gases are available which are superior to carbon monoxide either chemically or economically or in both respects.

Mixtures of the two gases just referred to can be obtained by partially oxidizing hydrocarbons such as those that constitute natural gas and mineral oil by means of steam, carbon dioxide or air with or without the aid of catalysts. Where such hydrocarbons are available it is possible to cheaply produce the mixtures in question. It is true that in the execution of my processes I do not actually carry out such preliminary oxidations relying on these reactions to take place in the reduction furnace. However the preliminary oxidation reaction is more easily understood when the assumption is made that it is performed outside of the furnace and precedes the reduction.

Unfortunately mixtures that result from the partial oxidation of methane, which is available in the form of natural gas, are not able for instance to maintain the reduction of oxides of iron at temperatures suited for the process. This is apparently due to the fact that hydrogen predominates in the products resulting from partial oxidation of methane. The mixtures that result from partial oxidation of higher members of the paraffine series are richer in carbon monoxide and for that reason they are more suitable for the purpose in question than those derived by partial oxidation of methane. For instance a far superior mixture may be produced by partial oxidation of butane, a constituent of natural gas which is obtained as a by-product in places where natural gas is prepared for use as commercial and domestic fuel and therefore available at low prices. The partial oxidation of still higher members of the series results in a still higher carbon monoxide content of the mixture resulting from partial oxidation and therefore in a more exothermic reduction reaction. The chemical constitution of the hydrocarbons utilized, particularly the degree of saturation and the form of the chain, is of as much importance as the size of the molecule. It will be referred to again below.

Another factor that enters into considerations of this kind is the heat produced by the partial combustion of the various hydrocarbons to carbon monoxide and hydrogen, which is considerable for the higher hydrocarbons, while it is negligible for the lower members. It is on account of this that the available heat for the reduction of metal ore rapidly rises with the number of carbon atoms in the molecule and that sufficient heat generation may be obtained without resorting to the very high members of the series, where this heat is made available, as it is when the process is conducted in certain ways, as will be made evident below. It is, of course, also possible to add finely divided carbon to the partially oxidized gas mixture subjected to oxidation, if a very strong exothermic effect is desired. On the other hand it should be pointed out that too much heat development results in sintering and other undesirable effects and is therefore to be avoided.

It will be clear from what I have said that a reducing gas which by itself does not produce a sufficiently strong exothermic reaction may be made to do this by adding oxygen and another substance (provided it is not already contained in the gas mixture) which on oxidation forms a substance that is still reducing and in so doing develops a large amount of heat. Carbon for instance as already mentioned develops a large amount of heat in burning to carbon monoxide. In a similar way acetylene gas forms much heat in forming carbon monoxide and hydrogen, and cyclic hydrocarbons oxidize to the same products with considerable heat production, while carbon bisulfide is strongly exothermic in burning to carbon monoxide and sulfur or sulfur compounds. Other substances act in a similar way, for instance many of the unsaturated hydrocarbons fall into this group as well as aromatic, naphthenic, heterocyclic hydrocarbons and their derivatives. Alcohols, for instance, oxidize to aldehydes and still retain their reducing action. On the evidence presented it follows that there are various substances available both organic and inorganic which produce a large amount of heat on partial oxidation, are still reducing after such partial oxidation and therefore may be introduced to make a reaction exothermic that otherwise would be endothermic.

It should be noted that substances which are strongly exothermic and also very reactive in combining with oxygen, particularly acetylene, are formed by the cracking of hydrocarbons and accordingly may be produced by such processes.

It will be evident from the preceding remarks that the substances defined as exothermic on partial oxidation but still reducing after such partial oxidation can not only be used to impart these characteristics to a given gas mixture but can also be used by themselves as exothermic reducing agents.

3. The exothermic oxidation reaction is carried out in the presence of the ore which means that the formation of the reducing agent and the reduction of the ore take place simultaneously. In this connection it should be noted that the metal compounds and metals with which this application deals, particularly metallic iron, nickel and cobalt act as catalysts for the oxidation reaction and facilitate the same.

4. The material to be reduced and the reducing gases flow concurrently through the reduction zone. The bearing of this feature of my process on the resulting reaction will be referred to again later and its advantages will become apparent.

In order to clearly describe my processes I will discuss, by way of illustration, certain procedures. Apparatus for this purpose is represented in sectional elevation in two different forms in Figures 1 and 2 respectively. Figures 3, 4 and 5 represent apparatus for carrying out the process commercially. These figures also are diagrammatic sectional elevations. The apparatus shown in Figures 3 and 4 is developed from that of Figure 1, while that shown in Figure 5 is developed from that of Figure 2.

In Figure 1, a piece of pipe 1 is set up vertically, contacting at its lower end and continuing into the narrower pipe 2. Pipe 1 is surrounded by heat insulating material 3 and both pipe and heat insulating material rest on a base plate 4. A mixture of a suitable gas, say butane and air, is introduced through 2 and the mixture ignited. This forms a flame in pipe 1. Then fragments of ore, say hematite, are introduced into the pipe 1 and pile up in the same. If there is sufficient space between the ore fragments, and they are introduced gradually the flame keeps on burning. However the existence of a flame is not absolutely necessary, the combustion may also take place on the surfaces of the reduced and unreduced ore particles. If the proportion between air and butane is correctly chosen, the ore fragments in the upper part of the shaft will gradually, although slowly, be reduced to metallic iron, while no metallic iron will be found in the lower part, due to the presence of unconsumed oxygen in the gases of that region. This is obviated in the presently described apparatus.

The composition of gases suitable for the reduction may be determined by maintaining the inflowing mixture constant and sampling the outflowing gases after the reduction is finished. In one of such experiments the carbon dioxide in the outflow amounted to 4.6 volume percent, the carbon monoxide to 15.6 volume percent, with a trace of unconsumed oxygen.

If in the above example the combustion had been to carbon dioxide and water according to the equation:

the required butane and oxygen (assuming the former having been chemically pure) would have been in the proportion of 1 to 6.5 volumes or of one butane to 32.5 volumes of air. Accordingly 3.0% butane would have been required in the butane-air mixture.

If the combustion had been to carbon monoxide and hydrogen according to the equation:

the required butane and oxygen (assuming the former again as having been chemically pure) would have been in the proportion of 1 to 2 volumes or of one butane to 10 volumes of air. Accordingly 9.1% butane would have been required in the butane-air mixture.

Combining the equations in such a proportion as to produce CO and $CO_2$ in the proportions found lead to the conclusion that the butane-air mixture actually used contained 7.7% butane.

The temperature within the reaction shaft varies from point to point and it is therefore difficult to assign a definite temperature to the reaction. It is for this reason much safer to regulate the reaction on the basis of the flowmeter readings of the individual gases than on the basis of temperature measurements. However representative figures for reduction temperatures may be obtained by calculations based on the thermochemical characteristics of the reactants. In choosing proper air-butane mixtures it should be considered that the butane content must be high enough to make the mixture sufficiently reducing but not so high that the deposition of carbon, naphthalene, etc., interferes with the reduction and the flame temperature becomes so low that it slows down the reduction excessively.

The reduction possible by butane-air mixtures may prove too slow for commercial application, but the methods for speeding up the reaction will be explained later. Preheating the reactants and the use of air enriched with oxygen are some such measures besides the modification of the reducing gas which will be discussed further.

Figure 2 illustrates the principles underlying another form of apparatus in which my process may be conducted. A spray gun by means of which metal spraying operations are carried out may serve the purpose. There are two types of such guns. One in which metal in the form of a wire is fused and sprayed and another one in which the metal is used in the form of a powder. I have used the latter, more particularly the type known as the "Schoop powder gun" for the purpose in question but in place of using a metal I have used a powdered metal oxide. Figure 2 represents various parts of such a spray gun outfit. For the present occasion the construction of the spray gun proper is immaterial and I have therefore indicated it only in a diagrammatic way and have not described its construction.

Acetylene is the combustible gas which is generally used in spray guns of this type to furnish the heat units required, by reacting with oxygen. When a metal oxygen compound is substituted for the metal it also furnishes the reducing power. The acetylene gas enters the mixer 6 through the tube 7 and mixes with the oxygen gas which enters the mixer 6 through tube 8. Mixer 6 can be of any suitable character; I have successfully used a Venturi type mixer, wherein one gas flows through a Venturi tube and the other gas is admitted adjacent the Venturi throat, to effect the mixing of the gases. The mixture then enters the spray gun.

The metal powder (the place of which is taken by a powdered metal oxygen compound when a reduction is attempted) is contained in the powder mixer 9. Air is brought in through the tube 10 which branches before reaching the powder mixer, part of the air passing through the mixer 9 to the spray gun 11, part by-passing the mixer and going directly to the spray-gun. The air entering the powder mixer from the bottom is deflected sidewise by the baffle 12, the horizontal currents thus created keeping the powder from settling on the bottom and effecting its mixture with air. The current of hot gases carrying finely divided metal particles in suspension and the auxiliary current of air entering through 10 are directed away from the gun as indicated by the arrow. The metal is accordingly deposited on surfaces put in front of the gun which can discharge into a suitable chamber wherein reducing conditions are maintained.

One test showed that the reduction of copper oxides to metallic copper is possible, another one that hematite may be reduced to magnetite in this apparatus. Figure 2 is essentially meant to illustrate reducing powdered ore in a flowing stream of gases.

Figure 3 shows a method for applying the principles underlying the reduction as represented by Figure 1 as a successful technical operation. The ore is lump ore sufficiently free from fines as not to impede the circulation of the gases through the mass of ore. To be specific in regard to the kind of ore that may be treated in the furnace to be described it will be assumed that it is hematitic iron ore. It enters into the hopper 13, its rate of entrance into the shaft 14 being regulated by gate 15. After passing through the shaft the ore which has been acted upon by the reducing gases to be discussed below and has been reduced to metal or a lower state of oxidation leaves through the chute 16 its rate of discharge being regulated by the gate 17. The reducing gas enters through the branch 18 of the pipe 20, while air enters through the branch 19 of pipe 20 into the shaft 14 by means of a tuyère like opening 21, a similar opening 22 serves for the escape of the waste gases. In order to prevent heat losses through radiation the walls of the furnace are well insulated by a suitable refractory and insulating lining being provided in the furnace.

When metals of high affinity for oxygen are reduced the hydrogen and carbon monoxide content of the escaping gases is high enough to permit their combustion. Provision for such combustion and for the use of the heat thereby made available is made in Figure 4 which is somewhat more complex than Figure 3. The shaft is lengthened, and while the lower portion fulfils the function described in connection with Figure 3, the upper portion serves for the combustion of the exit gases leaving port 22. These gases are carried off by means of pipe 24, the transport being effected by a blower 25. Air in a sufficient amount to support the combustion is injected into pipe 24 through the branch pipe 26, the mixture entering the shaft of the furnace through a tuyère like opening 27. The waste gases leave through a similar opening 28.

The operation of furnaces in the manner indicated in Figures 3 and 4 will offer little difficulty to those skilled in the art. Preferably the operation is controlled by the relative and absolute amounts of air and reducing gas. The permissible proportions will naturally vary with specific conditions, particularly with the nature of the metal to be reduced. Where iron is to be produced as assumed in the preceding description the amount of $CO_2$ and $H_2O$ in the gases issuing from port 22 should be well below the equilibrium figures established by thermodynamical research in order to maintain a high operating capacity. Very much greater percentages than for iron are of course permissible in the reduction of nobler metals, lower percentages in the reduction of metals with greater affinity for oxygen.

It will be evident that a characteristic of my process is that the ore to be reduced travels concurrently to the gases through the reduction zone. It will also be evident that the operation in apparatus illustrated in Figures 3 and 4 is carried out at temperatures below the melting and softening points for metal and ore. In the case of hematitic iron ore containing some of the ordinary gangue materials the temperature should in no part of the furnace exceed 1200 degrees C. very much. There is no lower temperature limit except that imposed by considerations for a commercially sufficient oxidation and reduction capacity.

By the concurrent flow of gases and ore in Figures 3 and 4 I obviate largely the presence of any unreduced ore in the exit stream of material for the most reduced ore is in the presence of the most oxidized gas ($CO_2$) but only in a lower temperature region at which $CO_2$ is comparatively stable.

In operations with apparatus indicated in Figure 5 higher temperatures may be utilized than in operations with apparatus shown in Figures 3 and 4. In contrast to apparatus of Figures 3 and 4 it is meant for the reduction of powdered ore.

In Figure 5, 13 represents a storage hopper for the finely divided ore, 28A a screw conveyor dropping the ore into the chute 29. It is thereby brought into the field of action of the nozzle 30 which emits combustible gases blowing the finely divided ore through chamber 31 into the reduction chamber 32 where the combustible gas is ignited, the gas mixture being such that a reducing flame of sufficiently high temperature results which effects the reduction of the ore. The reduced ore drops into the hoppers 34 from which it may be drawn off periodically through the valves 35. This is of course only possible when the ore is absolutely unsintered. In the case that it is sintered it may be collected by other methods. For instance, the reduced ore may be sprayed on a foundation and be collected as it is in the regular spraying process, or it may, if it is easily fusible, be collected in a fused bath. If the reduced metal is volatile, as for instance metallic zinc, chambers for catching the volatilized material take the place of the hoppers 34.

It will be assumed that cuprous oxide is subjected to the reducing process carried out with finely divided ore. The reduction of hematite to magnetite is of course also easily carried out in the apparatus. The reducing gas is indicated in Figure 5 as coming from pipe 18, the air as coming from pipe 19 before joining in pipe 20 and being drawn into blower 36. The latter forces the mixture through the nozzle 37 with sufficient force to carry along the ore powder dropping through chute 29 as described before.

It will be seen from the description of apparatus and operations that a concurrent flow of ore and gases is characteristic of my processes. If desired, the advantages of countercurrent operation may however be obtained by combining several furnaces in such a way as for instance a number of settling tanks are coupled in countercurrent decantation to obtain the countercurrent effect.

It will also be seen that ore and metal are in a position to act as catalysts. As mentioned before, such catalytic effect assisting in the partial oxidation of the reducing gases exists particularly when metals like iron, nickel, cobalt are reduced by my processes. The catalytic action is not equally important when metals with less affinity to oxygen are to be reduced or when the reduction is not to be carried to the metallic stage as in the reduction of hematite to magnetite. Particularly in cases where the catalytic effect is not strong it is necessary that the gas reaction be quite complete, as naturally appreciable amounts of free oxygen will interfere with the reduction process. The following considerations will permit the choice of proper gas mixtures for the reductions to be carried out.

For a theoretical consideration of the matter the reaction may be segregated into its two phases even if the phases are carried out simultaneously, namely the preliminary oxidation reaction and the following reduction. The reduction step does not require any further discussion. It will take place if sufficient heat is provided by the total reaction to maintain the required reaction temperature, if reducing agents of the required reducing power and chemical activity are provided by the preliminary oxidation and if the preliminary oxidation reaction is carried to such completeness that the oxygen by means of which the oxidation is performed is destroyed with practical completeness. The possibility of carrying out exothermic reductions will therefore be given if reactions of partial oxidation resulting in the formation of reducing substances can be found that take place with essential completeness.

Limiting myself to hydrocarbons, as I intend to sketch the situation, I will state that examination shows that all gaseous hydrocarbons are explosive when mixed with air in such proportions that the explosion forms water and carbon dioxide. Only very few of the gaseous hydrocarbons however are explosive when mixed with air in such proportions as to form carbon monoxide and hydrogen. The outstanding hydrocarbon in point of inflammability is acetylene which explodes at room temperature when ignited even in mixtures that contain much less air than is required for the latter reaction. Other examples not quite so striking are ethylene and benzene. Butane does not explode in mixtures containing only enough air to form CO and $H_2$, but it is close to the border line and relatively gentle heating of the mixture makes it explode. Methane-air mixtures of such composition require very high heating of the mixture to explode. Their use for the purpose under discussion is therefore out of the question not to mention the fact that their use would jeopardize the second part of the reaction.

It is well known and will have been concluded from what has been said that the limits of inflammability widen materially with rising temperatures. Therefore, at higher temperatures a relatively small percentage of a highly explosive gas like acetylene added to a mixture of a less reactive gas and air will be sufficient to make the mixture explosive enough for the purpose in question.

What I have disclosed is sufficient to guide those that wish to execute my processes in finding gas mixtures that may be utilized besides those the use of which I have described previously.

I claim:

1. A process for producing a sponge metal from an oxide of said metal comprising establishing and maintaining a flowing stream of finely divided ore containing said oxide, establishing and maintaining a substantially cold flowing stream of air and a hydrocarbon gas, said hydrocarbon containing more than one C atom and burning exothermically, mixing said ore stream and said air and gas stream, and igniting said air and gas stream while said streams are flowing in the same direction, said air and gas in said stream being present in such proportions that said gas is only partially reduced upon ignition with said air to produce substantially all the heat and reducing atmosphere in the presence of said ore which are necessary and effective to reduce said oxide substantially to sponge metal.

2. A process for reducing metal oxide comprising establishing and maintaining a flowing stream of finely divided ore containing said oxide, establishing and maintaining a substantially cold flowing stream of air and a hydrocarbon gas, said hydrocarbon containing more than one C atom and burning exothermically, mixing said ore stream and said air and gas stream, and igniting said air and gas stream while said streams are flowing in the same direction, said air and gas in said stream being present in such proportions that said gas is only partially reduced upon ignition with said air to produce substantially all the heat and reducing atmosphere in the presence of said ore which are necessary and effective to reduce said oxide.

RUDOLF GAHL.